United States Patent
Krajenke et al.

(10) Patent No.: US 10,690,052 B2
(45) Date of Patent: Jun. 23, 2020

(54) TURBOCHARGER ASSEMBLY

(71) Applicant: GM GLOBAL TECHNOLOGY OPERATIONS LLC, Detroit, MI (US)

(72) Inventors: Jessica L Krajenke, Oxford, MI (US); Ronald M Tkac, Brighton, MI (US); Vincent J Tylutki, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 391 days.

(21) Appl. No.: 15/600,166

(22) Filed: May 19, 2017

(65) Prior Publication Data

US 2018/0334958 A1    Nov. 22, 2018

(51) Int. Cl.

| | |
|---|---|
| *F02C 6/12* | (2006.01) |
| *F01D 25/30* | (2006.01) |
| *F01D 25/32* | (2006.01) |
| *F01D 9/02* | (2006.01) |

(52) U.S. Cl.
CPC ............... *F02C 6/12* (2013.01); *F01D 9/026* (2013.01); *F01D 25/30* (2013.01); *F01D 25/32* (2013.01); *F05D 2220/40* (2013.01); *F05D 2240/14* (2013.01); *F05D 2260/602* (2013.01); *F05D 2260/608* (2013.01)

(58) Field of Classification Search
CPC ........ F02D 9/026; F01D 25/305; F01D 25/30; F01D 25/32; F02C 6/12; F02C 6/10; F05D 2260/602; F02B 37/02
See application file for complete search history.

(56) References Cited

U.S. PATENT DOCUMENTS

| | | | |
|---|---|---|---|
| 3,056,539 A | * 10/1962 | Pullin | ..................... F02C 7/143 417/203 |
| 2013/0108429 A1 | 5/2013 | Sung et al. | |
| 2014/0026562 A1 | * 1/2014 | Brueck | ..................... F02C 7/00 60/605.1 |

FOREIGN PATENT DOCUMENTS

| | | | |
|---|---|---|---|
| DE | 102018111918 A1 | * 11/2018 | ............. F01D 25/30 |
| JP | 2008208787 A | * 9/2008 | |
| WO | 2008139302 A2 | 11/2008 | |
| WO | 2014188245 | 11/2014 | |

\* cited by examiner

*Primary Examiner* — Ngoc T Nguyen
(74) *Attorney, Agent, or Firm* — Cantor Colburn LLP

(57) ABSTRACT

A turbocharger assembly is provided which prevents liquid moisture 82 from damaging an air fuel ratio sensor affixed to the exhaust pipe. The turbocharger assembly includes a turbine housing, a turbine wheel, a volute defined in the turbine housing, and an upwardly extending exhaust pipe. The turbine housing may be affixed to a center turbocharger housing member. The turbine housing includes an anterior region and a posterior region having the volute. The turbine wheel may be disposed in the turbine housing. A liquid moisture 82 pathway may be defined in the turbine housing and is configured to provide liquid fluid communication from the anterior region toward the volute.

15 Claims, 5 Drawing Sheets

TURBOCHARGER ASSEMBLY

TECHNICAL FIELD

The present disclosure relates to turbochargers used in vehicle engines, and more specifically, to an improved turbocharger which prevents damage to oxygen sensors in the turbine housing.

BACKGROUND

Turbochargers may include a turbine housing connected to the engine's exhaust manifold, a compressor housing connected to the engine's intake manifold, and a center bearing housing coupling the turbine and compressor housings together. A turbine wheel in the turbine housing is rotatably driven by an inflow of exhaust gas supplied from the exhaust manifold. A shaft rotatably supported in the center bearing housing connects the turbine wheel to a compressor wheel in the compressor housing so that rotation of the turbine wheel causes rotation of the compressor wheel. The shaft connecting the turbine wheel and the compressor wheel defines an axis of rotation. As the compressor wheel rotates, it increases the air mass flow rate, airflow density and air pressure delivered to the engine's cylinders via the engine's intake manifold.

Turbochargers deliver compressed air to an engine intake, allowing more fuel to be combusted, thus boosting an engine's horsepower without significantly increasing engine weight. Thus, turbochargers permit the use of smaller engines that develop the same amount of horsepower as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of a cleaner environment.

The above information disclosed in this Background section is only for enhancement of understanding of the background of the invention, and therefore, it may contain information that does not form the prior art that is already known in this country to a person of ordinary skill in the art.

SUMMARY

The present disclosure provides a turbocharger assembly which prevents liquid moisture 82 from damaging an air fuel ratio sensor affixed to the exhaust pipe. The turbocharger assembly includes a turbine housing, a turbine wheel, a volute defined in the turbine housing, and an upwardly extending exhaust pipe. The turbine housing may be affixed to a center turbocharger housing member. The turbine housing includes an anterior region and a posterior region having the volute. The turbine wheel may be disposed in the turbine housing. A liquid moisture 82 pathway may be defined in the turbine housing and is configured to provide liquid fluid communication from the anterior region toward the volute. It is understood a sensor may, but not necessarily be included as part of the turbocharger assembly.

The liquid moisture 82 pathway formed in the turbine housing may include a substantially planar region and a neck region. The neck region may be adjacent to the shaft of the turbine. The substantially planar region may be operatively configured to direct a liquid from the anterior region to the neck region. The neck region may be operatively configured to direct the liquid toward and into the volute and away from the anterior region of the turbine housing.

It is further understood that the volute may be operatively configured to trap the liquid until a heated exhaust gas flow heats and evaporates the liquid into a gaseous moisture.

Moreover, the turbine may be operatively configured to further disperse the gaseous moisture when the gaseous moisture travels from the posterior region to the anterior region as part of the heated exhaust gas flow. To the extent a sensor is included in the aforementioned assembly, the sensor is an air-fuel ratio sensor which is sensitive to any contact with the liquid.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1:
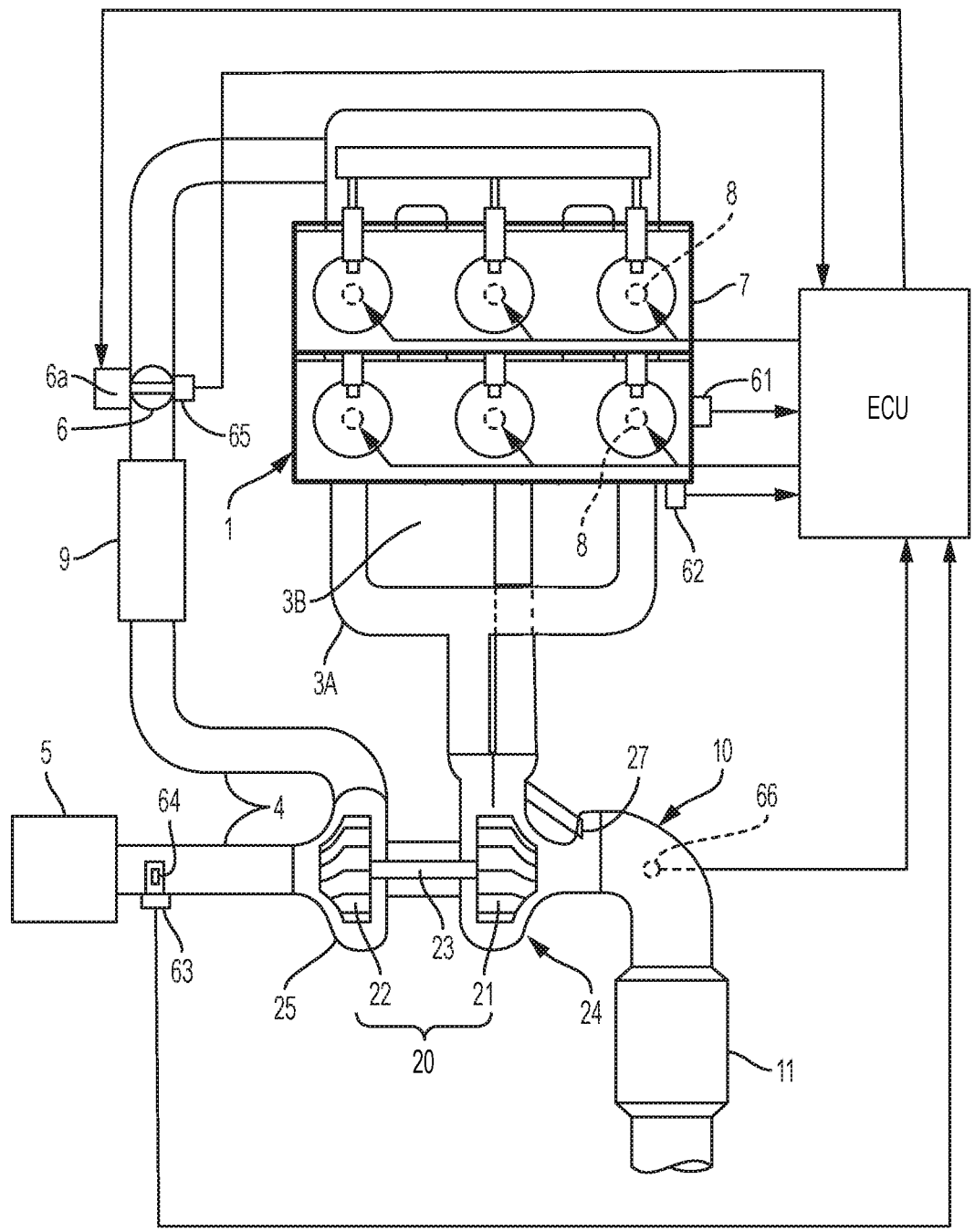
FIG. 1 is a partial schematic cross-sectional view of a prior art engine having a turbocharger.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

As shown in FIG. 1, a schematic view generally shows the layout of an engine having a traditional exhaust pipe 10 which extends in a traditional downward direction relative to the turbine housing 24. The internal combustion engine (engine 1) shown as an example in this embodiment is a V-6 engine. As shown in FIG. 1, an intake manifold 2 for distributing and supplying intake air to the cylinders is attached to the engine 1. Further, exhaust manifolds for gathering exhaust gas discharged from the cylinders is attached to the engine 1.

An intake pipe 4 for taking in air from the atmosphere is connected to the intake manifold 2. An air cleaner 5 is attached to an inlet of the intake pipe 4. A part where the intake manifold 2 and the intake pipe 4 are combined corresponds to an "intake air passage."

On an upstream side of the intake manifold 2 in an intake air flow direction, a throttle valve 6 for adjusting an amount of intake air into the engine 1 is provided. The throttle valve 6 is operated by a throttle motor 6a and an electronic control unit (ECU) 50. Also, injectors (fuel injecting valves) 7 that inject fuel directly to cylinders, spark plugs 8, and so on are attached to the engine 1.

The first exhaust manifold 3A is connected to respective exhaust ports of the cylinders of the engine 1. The second exhaust manifold 3B is connected to other respective exhaust ports of engine cylinders. Each of the exhaust manifolds 3A, 3B is formed to be forked on the upstream side, and has a shape to be united into one on the downstream side. In short, the shape of the exhaust manifolds of the engine 1 is a 2 in 1 shape.

Further, a turbo supercharger 20 is attached to the downstream side of the two exhaust manifolds 3A, 3B. The turbo supercharger 20 is a supercharger that supercharges intake air (fresh air) and supplies the intake air to the engine 1 by using exhaust pressure. The turbo supercharger 20 is provided with at least turbine blades 21, a compressor impeller 22, and so on.

As a basic operation of the turbo supercharger 20, the turbine blades 21 are rotated by energy of exhaust gas discharged to the exhaust manifolds 3A, 3B from the engine 1. As the compressor impeller 22 is rotated integrally with the above-mentioned rotated turbine blades 21, air inhaled into the intake pipe 4 is supercharged. Then, the above-mentioned air is forced into combustion chambers of the respective cylinders of the engine 1. Air supercharged by the compressor impeller 22 is cooled by an intercooler 9. The intercooler 9 is disposed in the intake pipe 4 on the downstream of the compressor impeller 22 in the intake air flow direction.

The turbine blades 21 are provided to be able to rotate inside the turbine housing 24. The compressor impeller 22 is provided inside a compressor housing 25 disposed in a middle of the intake pipe 4. The compressor impeller 22 is attached to a turbine shaft 23 that is integral with the turbine blades 21. Thus, the turbine blades 21 and the compressor impeller 22 rotate integrally with each other.

A traditional downward exhaust pipe 10 for releasing exhaust gas into the atmosphere is connected to the downstream side of the turbine housing 24. The traditional downward exhaust pipe 10 is a component called an "elbow". The traditional downward exhaust pipe 10 is an exhaust pipe having a shape that goes straight along a discharge direction of exhaust gas sent out from the turbine blades 21, and then bent at about 90 degrees and extends downwardly from the turbine blades 21 and housing 24 in a vertical direction. In short, the traditional downward exhaust pipe 10 explained above is an exhaust pipe formed into, for example, a "reverse upside down L shape," A catalyst 11 for purifying exhaust gas is provided in a downward part of the traditional downward exhaust pipe 10. Further, an air-fuel ratio sensor 66 is provided in the exhaust pipe 1 upstream of the catalyst 11. Given that the traditional downward exhaust pipe 10 extends in a downwardly direction, any moisture that forms as the exhaust gases cools will travel down the exhaust pipe away from the air-fuel ratio sensor which is disposed at the top region of the traditional downward exhaust pipe 10.

Figure 2:
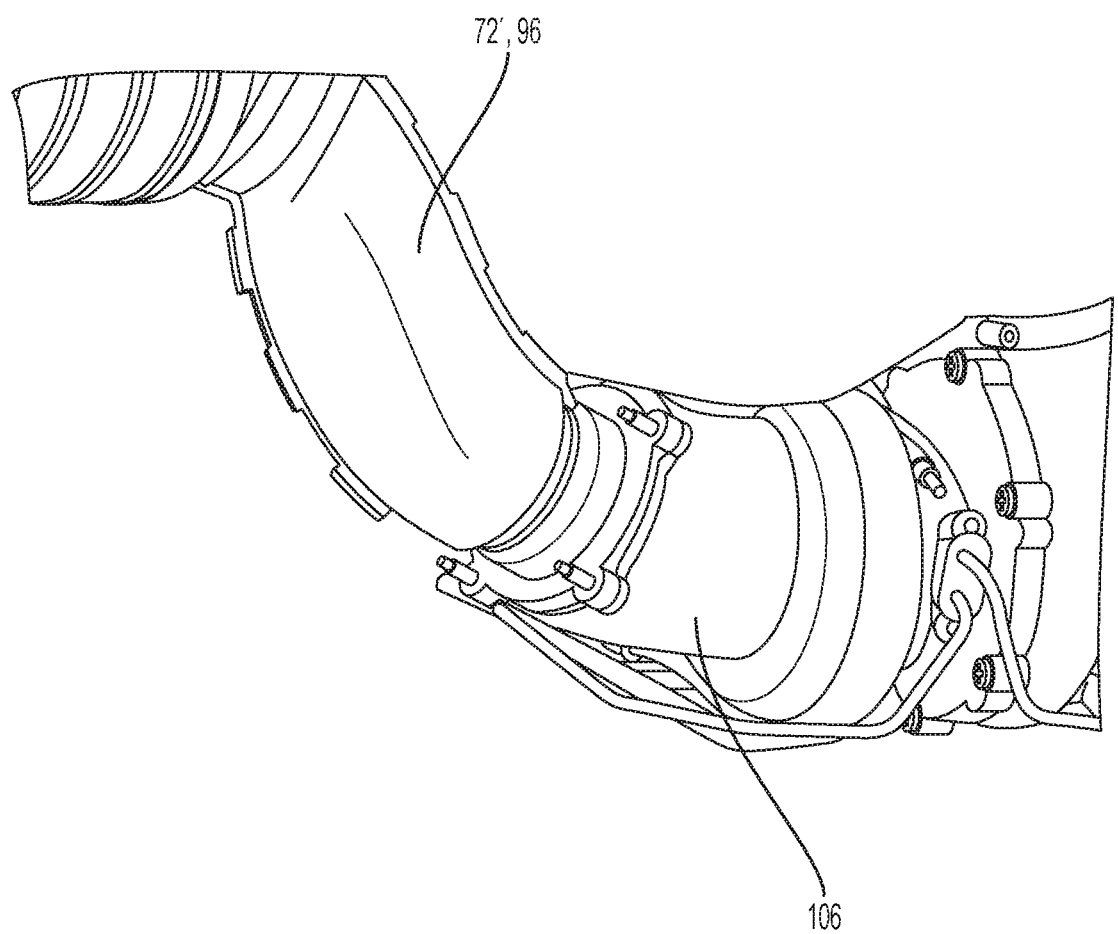
FIG. 2 is a partial perspective view of a turbocharger assembly of the present disclosure according to the present disclosure having the improved turbine housing and a new, upwardly extending exhaust pipe.

In contrast to a traditional downwardly extending exhaust pipe of FIG. 1, the present disclosure provides a new, upwardly extending exhaust pipe 72', 96 which provides for improved vehicle packaging (FIG. 2). FIG. 2 is a partial exterior view of the turbocharger assembly of the present disclosure where the exhaust pipe 72, 96 extends in a new upward direction (instead of a traditional downward direction) from the turbocharger 106. However, the new upwardly extending exhaust pipe from a traditional turbine housing 24' (FIG. 3) presents a new issue in that moisture that develops in the exhaust pipe 72' could otherwise collect at the base 73' of the traditional turbine housing 24' below and/or in front of the turbine wheel 21'.

Accordingly, when the engine restarts, the turbine wheel 21' tends to spray the collected liquid moisture (82 in FIG. 3) up into exhaust pipe 72' and onto the air-fuel ratio sensor 66 of a traditional turbine housing 24' (FIG. 3) is implemented. It is understood that the air-fuel ratio sensor 66' may be very sensitive to contact with liquid moisture 82, and therefore may be damaged due to this condition.

Figure 3:
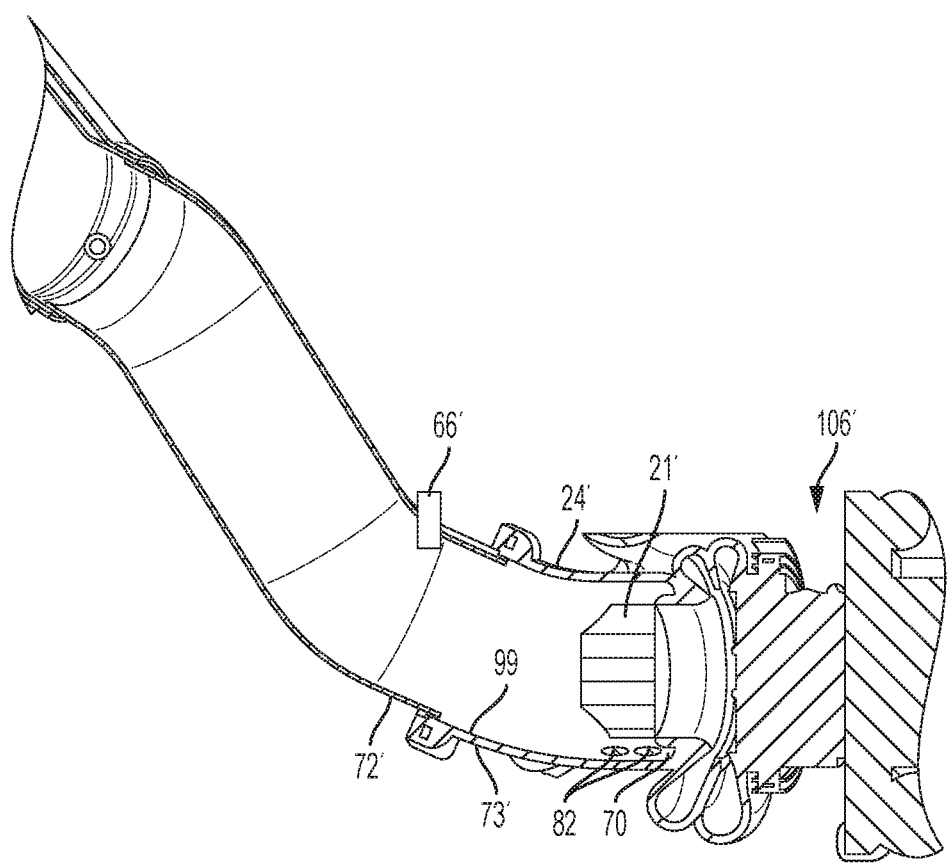
FIG. 3 is a partial schematic cross-sectional view of the new, upwardly extending exhaust pipe affixed to a traditional turbine housing.

As shown in FIG. 3, a traditional turbine housing 24' includes a collection region 70 where the liquid moisture 82 (from the cooled exhaust gases) collects in front of and/or below the turbine wheel 21' (i.e., blades) at the collection region 70. The collection region 70 may be in the form of a recess as shown in FIG. 3 or it may be a surface defined in a traditional turbine housing 24' proximate to the turbine wheel 21'. Accordingly, issues arise when any liquid moisture 82 that develops from the cooling exhaust gases becomes trapped in front of and/or below the turbine wheel 21' in the turbine housing 24' (in the collection region 70) proximate to the base of the exhaust pipe 72' given that such liquid moisture 82 may be sprayed onto the sensor 66' upon restart of the engine and spinning of the turbine wheel 21'.

Figure 4:
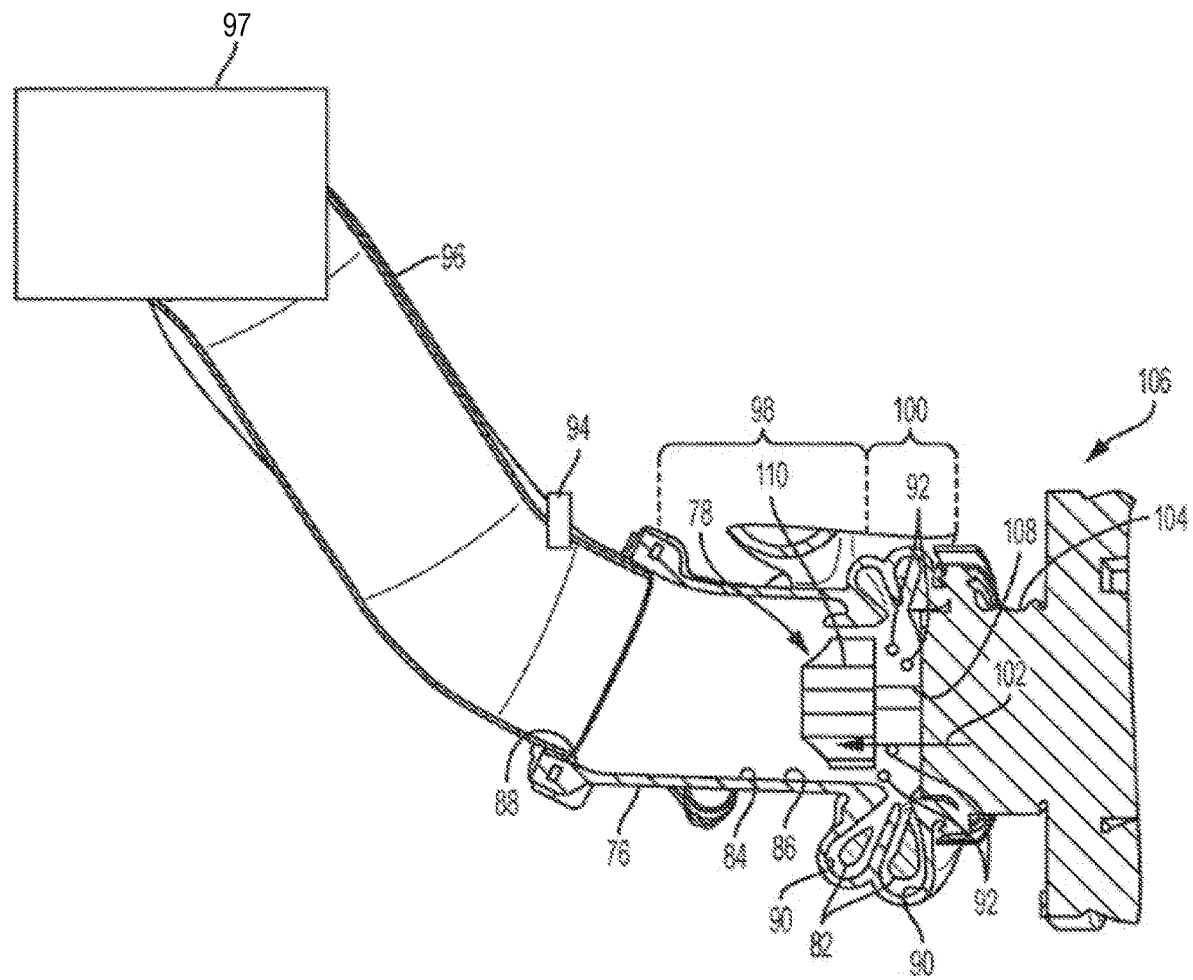
FIG. 4 is a partial schematic cross-sectional view of the turbocharger assembly of FIG. 2 in accordance with various embodiments of the present disclosure where the turbocharger assembly includes a new and improved turbine housing together with the new, upwardly extending exhaust pipe of FIG. 3.
Figure 5:
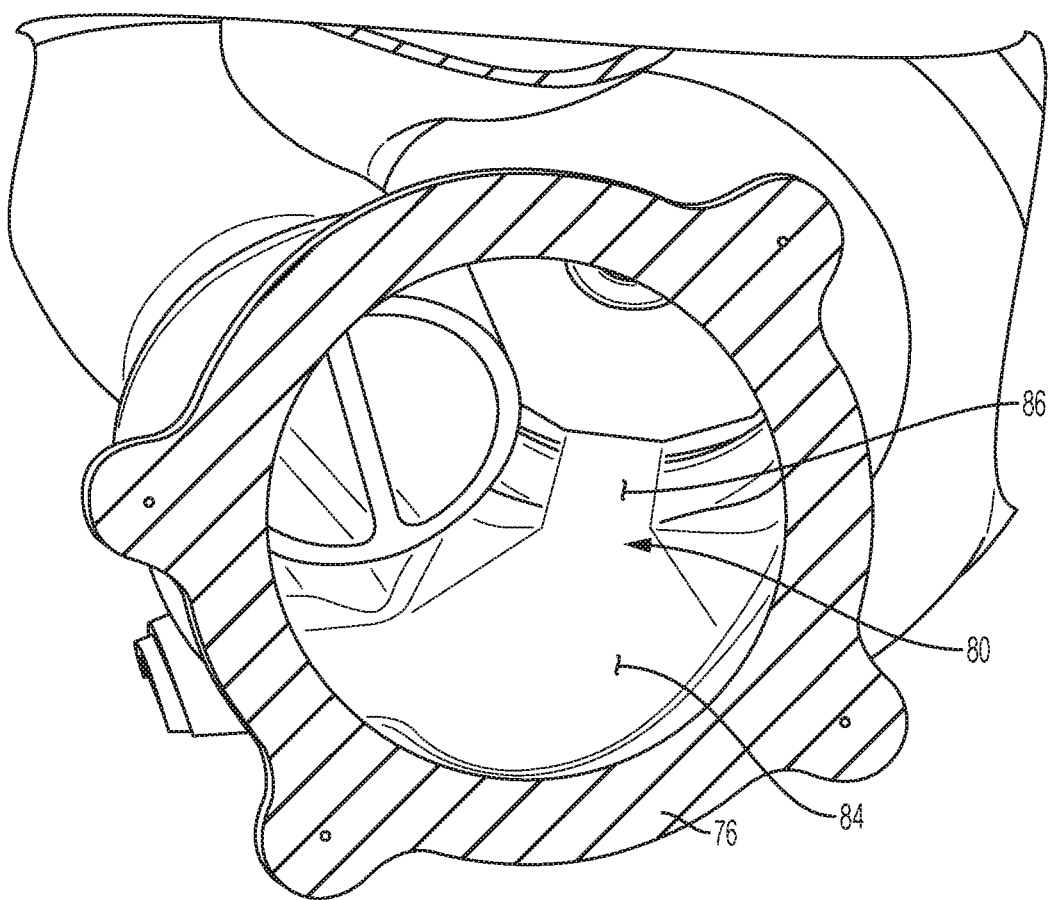
FIG. 5 is a partial view into the improved turbine housing of FIG. 4.

In light of the aforementioned issues where liquid moisture 82 damages the air-fuel ratio sensor 66', the present disclosure provides for a turbocharger assembly 12 (FIGS. 4 and 5) includes, but is not limited to, an improved turbine housing 76 and a new, upwardly extending exhaust pipe 96, 72'. The turbocharger assembly of the present disclosure evaporates, atomizes and disperses the liquid moisture 82 so that the liquid moisture 82 does not damage the air-fuel ratio sensor 94 (shown in FIG. 4). Referring now to FIG. 5, a partial, schematic view into the turbine housing 76 of the improved turbocharger assembly 12 according to the present disclosure is shown—with the turbine wheel 78 (shown in FIG. 4) removed to enable a view of the defined liquid moisture pathway 80. The defined liquid moisture pathway 80 may be operatively configured to transfer or direct liquid moisture 82 (formed in the turbine housing 76 and/or exhaust pipe 96) into the volute 90 (shown in FIG. 4). The liquid moisture 82 is formed when the engine 98 shuts off and the hot exhaust gases cool.

The liquid moisture pathway 80 (shown in FIG. 5) is defined in the improved turbine housing 76 of the present disclosure. The liquid moisture pathway 80 includes a substantially planar region 84 and a neck surface 86. The substantially planar region 84 may be generally disposed below the turbine wheel 78 and may further extend toward the anterior edge 88 of the turbine housing 76. The substantially planar region 84 is operatively configured to direct liquid moisture 82 initially formed in exhaust pipe 96 toward the neck surface 86 so that the liquid moisture 82 may be fed into the volutes 90 (shown in FIG. 4) which are positioned behind the turbine wheel 78 in the posterior region 100 of the turbine housing 76. Accordingly, the volutes 90 are configured to collect the liquid moisture 82 that develops from the cooled exhaust gases.

It is understood that it is preferable to have the volutes 90 collect the liquid moisture 82 behind the turbine wheel 78 in order to better heat the collected liquid moisture 82 to a high temperature given that the volutes 90 are closer to the combustion chambers of the engine. Upon restarting the engine, the heated exhaust gas 102 behind the turbine wheel 78 causes the liquid 82 collected in the volute 90 to heat up and evaporate. The evaporated moisture 92 may then travel through the spinning turbine wheel 78 which further disperses the moisture 92 such that the evaporated moisture 92 may be easily carried past the sensor 74 and through the upwardly extending exhaust pipe 96 to the catalytic converter 97. Accordingly, the sensor 74 of the turbocharger assembly 12 is no longer subject to unacceptable contact with liquid moisture 82 upon restart.

Therefore, as described above, a turbocharger assembly according to the present disclosure may include an improved turbine housing 76 (FIGS. 4 and 5), a turbine wheel 78, a volute 90 defined in the turbine housing 76, and an upwardly extending exhaust pipe 96, The turbine housing 76 may be affixed to a center turbocharger housing member 104. The turbine housing 76 includes an anterior region 98 and a posterior region 100 having the volute 90 or multiple volutes 90. The turbine wheel 78 may be disposed in the turbine housing 76 as shown. A liquid moisture pathway 80 may further be defined in the turbine housing 76 as shown in FIG. 5. The liquid moisture pathway 80 is configured to provide liquid fluid communication from the anterior region 98 toward the volute 90. It is understood a sensor 74 may, but not necessarily be included as part of the turbocharger assembly 12.

The liquid moisture pathway 80 formed in the turbine housing 76 may include a substantially planar region 84 and a neck region 86. The neck region 86 may be proximate to the shaft 108 of the turbine while the substantially planar region 84 may be disposed below the blades 110 of the turbine wheel 78 and may extend to the anterior edge 99 of the turbine housing 76 (in front of the turbine wheel 78). The substantially planar region 84 may be operatively configured to direct liquid moisture 82 from the anterior region 98 of the turbine housing 76 to the posterior region 100 of the turbine housing 76. The neck region 86 may be operatively configured to direct the liquid 82 toward and into the volute 90 and away from the anterior region 98 of the turbine housing 76. It is further understood that the volute 90 may be operatively configured to trap the liquid 82 until a heated exhaust gas flow 102 heats and evaporates the liquid 82 into gaseous moisture 112.

Moreover, the turbine wheel 76 may be operatively configured to further disperse the gaseous moisture 112 when the gaseous moisture 112 travels from the posterior region 100 to the anterior region 98 as part of the heated exhaust gas flow 102. To the extent a sensor 74 is included in the aforementioned assembly 12, the sensor 74 is an air-fuel ratio sensor which is sensitive to any contact with the liquid 82.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A turbocharger assembly comprising:
a turbine housing affixed to a center turbocharger housing member, the turbine housing having a first region and a second region, wherein the first region is located downstream of the second region with respect to a direction of exhaust gas flow;
a turbine wheel disposed in the turbine housing;
a volute defined in the second region of the turbine housing;
a liquid moisture pathway defined in the turbine housing, the liquid moisture pathway providing liquid fluid communication from the first region toward the volute in the second region;
an upwardly extending exhaust pipe affixed to the first region of the turbine housing and projecting upwardly from the first region in the direction of exhaust gas flow; and
a sensor affixed to the upwardly extending exhaust pipe.

2. The turbocharger assembly as defined in claim 1 wherein the liquid moisture pathway includes a substantially planar region and a neck region.

3. The turbocharger assembly as defined in claim 2 wherein the substantially planar region is operatively configured to direct a liquid from the first region to the neck region.

4. The turbocharger assembly as defined in claim 3 wherein the neck region is operatively configured to direct the liquid toward and into the volute and away from the first region of the turbine housing.

5. The turbocharger assembly as defined in claim 4 wherein the volute is operatively configured to trap the liquid until a heated exhaust gas flow heats and evaporates the liquid into a gaseous moisture.

6. The turbocharger assembly as defined in claim 5 wherein the turbine wheel is operatively configured to further disperse the gaseous moisture when the gaseous moisture travels from the second region to the first region as part of the heated exhaust gas flow.

7. The turbocharger assembly as defined in claim 6 wherein the sensor is an air-fuel ratio sensor being sensitive to any contact with the liquid.

8. A turbocharger assembly comprising:
a turbine housing affixed to a center turbocharger housing member, the turbine housing having a first region and a second region, wherein the first region is located downstream of the second region with respect to a direction of exhaust gas flow;
a turbine wheel disposed in the turbine housing;
a volute defined in the second region of the turbine housing;
a liquid moisture pathway defined in the turbine housing, the liquid moisture pathway providing liquid fluid communication from the first region toward the volute in the second region; and
an upwardly extending exhaust pipe affixed to the first region of the turbine housing, and projecting upwardly from the first region in the direction of exhaust gas flow.

9. The turbocharger assembly as defined in claim 8 wherein the liquid moisture pathway includes a substantially planar region and a neck region.

10. The turbocharger assembly as defined in claim 9 wherein the substantially planar region is operatively configured to direct a liquid from the first region to the neck region.

11. The turbocharger assembly as defined in claim 10 wherein the neck region is operatively configured to direct the liquid toward and into the volute and away from the first region of the turbine housing.

12. The turbocharger assembly as defined in claim 11 wherein the volute is operatively configured to trap the liquid until a heated exhaust gas flow heats and evaporates the liquid into a gaseous moisture.

13. The turbocharger assembly as defined in claim 12 wherein the turbine wheel is operatively configured to further disperse the gaseous moisture when the gaseous moisture travels from the second region to the first region as part of the heated exhaust gas flow.

14. The turbocharger assembly as defined in claim 13 further comprising a sensor affixed to the upwardly extending exhaust pipe downstream from the turbine housing.

15. The turbocharger assembly as defined in claim 14 wherein the sensor is an air-fuel ratio sensor being sensitive to any contact with the liquid.

* * * * *